(12) United States Patent
Wong et al.

(10) Patent No.: US 8,027,878 B2
(45) Date of Patent: Sep. 27, 2011

(54) METHOD AND APPARATUS TO COMPENSATE DEMAND PARTNERS IN A PAY-PER-CALL PERFORMANCE BASED ADVERTISING SYSTEM

(75) Inventors: Daric Wong, Daly City, CA (US); Scott Faber, San Francisco, CA (US); Ebbe Altberg, Mill Valley, CA (US); Mark Halstead, Auckland (NZ); Ron Hirson, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 1402 days.

(21) Appl. No.: 11/021,939

(22) Filed: Dec. 23, 2004

(65) Prior Publication Data

US 2005/0165666 A1 Jul. 28, 2005

Related U.S. Application Data

(60) Provisional application No. 60/560,926, filed on Apr. 9, 2004.

(51) Int. Cl.
*G06Q 30/00* (2006.01)
*G05B 19/418* (2006.01)

(52) U.S. Cl. .................. 705/14.73; 705/34; 379/133
(58) Field of Classification Search .............. 705/14, 705/34; 379/133
See application file for complete search history.

(56) References Cited

U.S. PATENT DOCUMENTS

| 4,313,035 A | 1/1982 | Jordan et al. |
|---|---|---|
| 4,577,065 A | 3/1986 | Frey et al. |
| 4,631,428 A | 12/1986 | Grimes |
| 4,645,873 A | 2/1987 | Chomet |
| 4,677,434 A | 6/1987 | Fascenda |
| 4,723,283 A | 2/1988 | Nagasawa et al. |
| 4,751,669 A | 6/1988 | Sturgis et al. |
| 4,752,675 A | 6/1988 | Zetmeir |
| 4,788,718 A * | 11/1988 | McNabb et al. ......... 379/112.08 |
| 4,847,890 A | 7/1989 | Solomon et al. |
| 5,058,152 A | 10/1991 | Solomon et al. |
| 5,148,474 A | 9/1992 | Haralambopoulos et al. |
| 5,319,542 A | 6/1994 | King, Jr. et al. |
| 5,325,424 A | 6/1994 | Grube |

(Continued)

FOREIGN PATENT DOCUMENTS

AU 699 785 5/1995

(Continued)

OTHER PUBLICATIONS

Fair Disclosure Wire. Full Year 2003 and Q4 ebookers plc Earnings conference call. Mar. 22, 2004.*

(Continued)

Primary Examiner — John G. Weiss
Assistant Examiner — Victoria Vanderhorst
(74) Attorney, Agent, or Firm — Greenberg Traurig, LLP

(57) ABSTRACT

One embodiment of the present invention provides a method and apparatus to track demand partners in a pay-per call performance based advertising system. In one embodiment, the method and apparatus include assigning at least one telephonic reference to an advertiser, the reference is to be included in an advertisement on a media channel of a demand partner. The advertiser is assessed a charge based at least in part on telephonic connections to the advertiser via the telephonic reference. The demand partner tracked with a predefined tracking model based at least in part on activity related to the telephonic reference.

18 Claims, 16 Drawing Sheets

U.S. PATENT DOCUMENTS

| | | |
|---|---|---|
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,448,625 A | 9/1995 | Lederman |
| 5,453,352 A | 9/1995 | Tachibana |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,793,851 A | 8/1998 | Albertson |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,077 A | 5/1999 | Harashima |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,416 A | 9/1999 | Block |
| 5,974,141 A | 10/1999 | Saito |
| 5,974,398 A | 10/1999 | Hanson et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,006,197 A | 12/1999 | d'Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardner et al. |
| 6,130,933 A | 10/2000 | Miloslavsky |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,192,050 B1 | 2/2001 | Stovall |
| 6,199,096 B1 | 3/2001 | Mirashrafi et al. |
| 6,212,192 B1 | 4/2001 | Mirashrafi et al. |
| 6,223,165 B1 | 4/2001 | Lauffer |
| 6,230,287 B1 | 5/2001 | Pinard et al. |
| 6,243,684 B1 | 6/2001 | Stuart et al. |
| 6,259,774 B1 | 7/2001 | Miloslavsky et al. |
| 6,269,336 B1 | 7/2001 | Ladd et al. |
| 6,269,361 B1 | 7/2001 | Davis et al. |
| 6,292,799 B1 | 9/2001 | Peek et al. |
| 6,298,056 B1 | 10/2001 | Pendse |
| 6,301,342 B1 | 10/2001 | Ander et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,430,276 B1 | 8/2002 | Bouvier et al. |
| 6,434,527 B1 | 8/2002 | Horvitz |
| 6,463,136 B1 | 10/2002 | Malik |
| 6,470,079 B1 | 10/2002 | Benson |
| 6,470,317 B1 | 10/2002 | Ladd et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,523,010 B2 | 2/2003 | Lauffer |
| 6,529,878 B2 | 3/2003 | De Rafael et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,570,870 B1 | 5/2003 | Berstis |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,757,364 B2 | 6/2004 | Newkirk |

| | | | |
|---|---|---|---|
| 6,836,225 B2 | 12/2004 | Lee et al. | |
| 6,968,174 B1 | 11/2005 | Trandal et al. | |
| 7,177,415 B1 | 2/2007 | Kim et al. | |
| 7,340,048 B2 | 3/2008 | Stern et al. | |
| 7,363,254 B2 | 4/2008 | Skinner | |
| 2001/0048737 A1 | 12/2001 | Goldberg et al. | |
| 2002/0003867 A1 | 1/2002 | Rothschild et al. | |
| 2002/0029241 A1 | 3/2002 | Yokono et al. | |
| 2002/0065959 A1 | 5/2002 | Kim et al. | |
| 2002/0087565 A1 | 7/2002 | Hoekman et al. | |
| 2002/0095331 A1 | 7/2002 | Osman et al. | |
| 2002/0120554 A1 | 8/2002 | Vega | |
| 2002/0133571 A1 | 9/2002 | Jacob et al. | |
| 2002/0173319 A1 | 11/2002 | Fostick | |
| 2002/0191762 A1* | 12/2002 | Benson | 379/133 |
| 2002/0193094 A1 | 12/2002 | Lawless et al. | |
| 2003/0043981 A1 | 3/2003 | Lurie et al. | |
| 2003/0046161 A1 | 3/2003 | Kamangar et al. | |
| 2003/0220866 A1* | 11/2003 | Pisaris-Henderson et al. | 705/37 |
| 2004/0096110 A1 | 5/2004 | Yogeshwar et al. | |
| 2004/0103024 A1* | 5/2004 | Patel et al. | 705/14 |
| 2004/0162757 A1 | 8/2004 | Pisaris-Henderson | |
| 2004/0204997 A1 | 10/2004 | Blaser et al. | |
| 2004/0234049 A1 | 11/2004 | Melideo | |
| 2004/0234064 A1 | 11/2004 | Melideo | |
| 2004/0236441 A1 | 11/2004 | Melideo | |
| 2004/0254859 A1 | 12/2004 | Aslanian, Jr. | |
| 2004/0258048 A1 | 12/2004 | Melideo | |
| 2004/0260413 A1 | 12/2004 | Melideo | |
| 2005/0010795 A1 | 1/2005 | Tagawa et al. | |
| 2005/0021744 A1 | 1/2005 | Haitsuka et al. | |
| 2005/0048961 A1 | 3/2005 | Ribaudo et al. | |
| 2005/0065811 A1 | 3/2005 | Chu | |
| 2005/0080878 A1 | 4/2005 | Cunningham et al. | |
| 2005/0096980 A1 | 5/2005 | Koningstein | |
| 2005/0114208 A1 | 5/2005 | Arbuckle et al. | |
| 2005/0203799 A1 | 9/2005 | Faber et al. | |
| 2005/0209874 A1 | 9/2005 | Rossini | |
| 2005/0220289 A1 | 10/2005 | Reding et al. | |
| 2006/0069610 A1 | 3/2006 | Rossini | |
| 2006/0074760 A1 | 4/2006 | Helin et al. | |
| 2006/0136310 A1 | 6/2006 | Gonen et al. | |
| 2006/0247999 A1 | 11/2006 | Gonen et al. | |
| 2007/0005585 A1 | 1/2007 | Feng et al. | |
| 2007/0230374 A1 | 10/2007 | Altberg et al. | |
| 2007/0230671 A1 | 10/2007 | Altberg et al. | |
| 2007/0230679 A1 | 10/2007 | Altberg et al. | |
| 2007/0242626 A1 | 10/2007 | Altberg et al. | |
| 2007/0269038 A1 | 11/2007 | Gonen et al. | |

FOREIGN PATENT DOCUMENTS

| | | | |
|---|---|---|---|
| GB | 2 329 046 A | | 3/1999 |
| JP | 409233441 A | | 9/1997 |
| JP | 409319812 A | | 12/1997 |
| JP | 2005141583 | | 6/2005 |
| KR | 2001086595 A | * | 9/2001 |
| KR | 20030043827 | | 6/2003 |
| WO | WO 97/05733 | | 2/1997 |
| WO | WO 98/02835 | | 1/1998 |
| WO | WO 98/04061 | | 1/1998 |
| WO | WO 98/13765 | | 4/1998 |
| WO | WO 98/38558 | | 9/1998 |

OTHER PUBLICATIONS

"USA Global Link Brings Interactively to Internet Shopping," Business Wire (Oct. 1998).

"Lucent Technology and Netscape Team to Deliver Lucent Ecommerce Solutions," Business Wire (Sep. 1998).

"TriNet's 'Help M, I'm Stuck' Internet Voice Button Service Pushes Web Pages to Online Users," Business Wire (Sep. 1998).

Rich Tehrani, "e-Rip Van Winkle and the 60-Second Nap," Call Center Solution, vol. 18, No. 2, pp. 16(3) (Mar. 1998).

"NetCall Internet Call-Buttons Enhance E-Commerce Customer Service and Sales," PR Newswire, 7431 (Aug. 1999).

"Connecting to On-Line Car Shoppers: Auto Sellers Use NetCall Internet Call-Button Technology to Turn 'Clicks' into Interactive Sales," PR Newswire, p. 4089 (Jul. 1999).

Ellen Greenblatt, "Have you ever wondered . . . ," Datamation, p. 126 (Oct. 1997).

Kiyoski Kabeya et al., "A New Teleconsultation Terminal System Using ISDN," NTT Review, pp. 37-43 (Jul. 1991).

Tom Davey, "Wheeling and Dealing Online," PC Week, vol. 13, No. 45, pp. 1 and 129 (Nov. 1996).

Stacy Collett and Julia King, "Why Online Browsers Don't Become Buyers," Computer World, vol. 33, No. 48, p. 14 (Nov. 1999).

Information about Expertcity.com retrieved from the Internet [http://www.expertcity.com] on Nov. 6, 2000.

Gregory Dalton, "Rent-An-Expert on the Web," Information Week, p. 75 (Sep. 6, 1999).

"Expertcity.com Launches Premier Online Marketplace for Expert Services," PR Newswire (Aug. 1999).

Information about Keen.com retrieved from the Internet [URL:http://www.keen.com] on Oct. 24, 2000, disclosure dates back to 1999.

Chris Ott, "Making Good on the Information Economy," Denver Business Journal (Dec. 17, 1999).

Michael Rogers, et al., "Experts Abound at New Web Sites," Library Journal, pp. 22-24 (Mar. 1, 2000).

"SurfBrains.com: Brains Online Save Time & Money," MS Presswire (Jul. 11, 2000).

Cynthia Hodgson, "Online Expert Databases & Services," Econtent, pp. 48-53 (Dec. 1999).

Michael Kanellos, "Do You Want to Know the Meaning of Life?," Computer Reseller News, pp. 73-74 (Mar. 3, 1997).

"Applying Technology News," Accounting Technology, p. 14 (Feb./Mar. 1997).

Joann M. Wasik, "Information for Sale: Commercial Digital Reference and AskA Services," Virtual Reference Desk, [http://www.vrd.org/AskA/commAskA.html] (Sep. 20, 1999).

EXP.com web-site at www.exp.com.

The web-site at www.experts-exchange.com.

Welcome to the Electronic Emissary Project's WebCenter at www.tapr.org/emissary.

The web-site at www.allexperts.com.

Richard A Kuehn, "The Voice of Technology," Credit World, pp. 20-23 (Jul. 1994).

Jeff Pelline, "Net Firm to Connect Users by Phone," CNET News.com [retrieved from http://new.cnet.com] (Oct. 24, 2000).

"Keen.com Launches First Live Answer Community," Press Release [retrieved from http://www.keen.com] (Oct. 24, 2000).

Jon Healey, "From A to Z, You Can Sell Advice Online," Mercury New [retrieved from http://www.O.mercurycenter.com] (Oct. 24, 2000).

Joseph Menn, "An Expert? There's Now a Home for Your on the Internet," Los Angeles Times [retrieved from http://www.denverpost.com] on Oct. 24, 2000.

"Walker Digitial Issued Landmark U.S. Patent No. 5,862,223 for Global Internet Marketplace for Experts," Business Wire (Jan. 26, 1999).

Qcircuit Web Site (www.qcircuit.com).

Infomarkets.com Web Site (www.infomarkets.com).

Intellect Exchange Web Site (www.intellectexchange.com).

Answers.com Web Page (www.answers.com).

Amir Herzberg, et al., "MiniPay: Charging Per Click on the Web," Computer Networks and ISDN Systems 29, (Sep. 1997) vol. 29, pp. 939-951.

Mary Wagner, "Caring for Customer. (Internet/Web/Online Information)—Real-time text chat and telephony provide personalized customer support and turn queries into sales leads," Internet World, Sep. 1, 1999, (3 pgs.).

Masahiko Hase, et al., "Advanced Videophone System Using Synchronized Video Filing Equipment," NTT Review, vol. 3, No. 4, pp. 29-36 (Jul. 1991).

Franco Mercalli, et al., "TheESSAI Teleshopping System: An Example of a Broadband Multimedia Application," Publication No. 0-7803-1820-X/94, IEEE, pp. 572-576 (1994).

Abhaya Asthana, et al., "A Small Domain Communications System for Personalized Shopping Assistance," Proceedings of ICPWC '94, Publication No. 0-7803-1996-6/94, IEEE, pp. 199-203 (1994).

Linda Littleton, HDD: A Helpdesk Database "Meet the Shadowy Future," Proceedings ACM SIGUCCS User Services Conference XXII, Ypsilanti, Michigan, pp. 205-210 (Oct. 16-19, 1994).

L.F. Ludwig, et al., "Laboratory for Emulation and Study of Integrated and Coordinated Media Communication," Conference on Office Information Systems, Sponsored by ACM SIGOIS and IEEECS TC-OA in cooperation with IFIP W.G. 8.4, pp. 283-291 (Mar. 23-25, 1988).

*Keen.com, Inc.* v. *InfoRocket.com, Inc.*, Preliminary Injunction Hearing, pp. 286-289 (Jan. 8, 2002).

*Keen.com, Inc.* v. *InfoRocket.com, Inc.*, Complaint for Patent Infringement, Trade Dress Infringement and Unfair Competition; Demand for Jury Trial filed Aug. 31, 2001, pp. 1-8 plus 17 pgs. of attachments.

E.J. Addeo, et al., "An Experimental Multi-Media Bridging System," Frontiers in Computer Communications Technology, Computer Communications Review, vol. 17, No. 5, pp. 236-242 (Aug. 11-13, 1987).

ISDN Tutorial: Definitions, http://www.ralphb.net/ISDN/defs.html (Apr. 21, 2000).

ISDN Tutorial: Interfaces, http://www.ralphb.net/ISDN/ifaces.html Apr. 21, 2000.

Telecommunications Buyers Guide and Directory, Editor & Publisher, pp. 29TC-38TC, Feb. 1994.

"Aspect Telecom: Aspect Integrates the Web Into the Call Center", M2 Presswire, Aug. 1996.

"Information, Bid and Asked", Forbes, Aug. 20, 1990, p. 92.

John Robinson, "Attachmate Ready to Answer Net Questions", Network World, Apr. 8, 1996, p. 37.

Edith Herman, "US Courts to Launch First Federal 900 Service", Federal Computer Week, Sep. 28, 1992, p. 8.

Barbara Jarvie, "Company Devoted to Hot-Line Support", Computer Reseller News, Oct. 21, 1991, p. 48.

"For Telesphere's Clients, Dial '1-900 TUF LUCK'", Business Week, Sep. 9, 1991, p. 88.

"When Business Plan and Real World Clash", Wall Street Journal, Jun. 9, 1999, p. B1.

Christina Wood, "Hidden Cost of Tech Support", PC World, May 1995, pp. 143-152 & p. 156.

J. Sairamesh, et al., "NetBazaar: Networked Electronic Markets for Trading Computation and Information Services", Research and Advanced Technology for Digital Libraries, Second European Conference, ECDL 1998, pp. 839-856 (Sep. 21-23, 1998).

William H. Chimiak, et al., "Multimedia Collaborative Remote Consultation Tools Via Gigabit WAN in Teleradiology", IEEE 1994, Phoenix, p. 417. (7 pgs.).

J.W.R. Griffiths, et al., "Multimedia Communication in a Medical Environment", IEEE 1991 Singapore I.C. on Networks, p. 166. (8 pgs.).

PCT Search Report for PCT Application No. PCT/US01/48284, filed Oct. 30, 2002 (corresponding to U.S. Appl. No. 09/702,217) mailed May 13, 2002. (7 pgs.).

Big Green Blog: Jan. 2005 Archives, Feb. 21, 2006.

Caring for Customers: Real-Time text chat and telephony provide personalized customer support and turn queries into sales leads, Internet World Media, Sep. 1999.

Information about Expertcity.com retrieved from the Internet [URL:http://www.expertcity.com] on Apr. 9, 2000.

Ingenio Press Archives for 2004, www.ingenio.com, Feb. 21, 2006.

Keen.com Feb. 4, 2006.

Keen.com Plans Web Service Allowing Customers to Hold Private Phone Chats, Don Clark, Wall Street Journal, Nov. 8, 1999.

Keen.com raises $60 Million from Prestigious . . . , Business Wire, Jan. 11, 2000.

PCT Search Report for PCT Application No. PCT/US01/48284, filed Oct. 30, 2001 (corresponding to U.S. Appl. No. 09/702,217) mailed May 13, 2002 (7 pgs.).

Sell and buy advice online, The Ottawa Citizen, Nov. 29, 1999.

"UpSnap Selects LookSmart to Sell Premium Listings on Free 411 Service for Text-Enabled Cell Phones", Nov. 4, 2004.

U.S. Appl. No. 09/596,466, filed Jun. 19, 2000, Agdeppa, Hector A.

U.S. Appl. No. 60/198,642, filed Apr. 20, 2000, Rothschild et al.

U.S. Appl. No. 60/471,535, filed May 19, 2003, Melideo.

"Introducing 1-800-FREE411: First Nationwide Free Telephone Directory Assistance Service" Jingle Networks, Inc., Huntington Beach, Calif., Sep. 20, 2005.

"Jambo Launches to Connect People and businesses From the Internet to the Phone", Agoura Hills, Calif. May 3, 2005.

"Jambo Names Netzero Co-founder Stacy Haitsuka to New Post of Chief Information Officer", Agoura Hills, Calif., Jul. 5, 2005.

"Jambo Receives $5 Million in Financiing from Kline Hawkes & Co., Westlake Venture Partners, Others", Agoura Hills, Calif., Oct. 17, 2005.

Keen.com Feb. 4, 2006.

Keen.com Plans Web Service Allowing Customers to Hold Private Phone Chats, Don Clark, Wall Street Journal, Nov. 8, 1999.

Keen.com raises $60 Million from Prestigious . . . , Business Wire, Jan. 11, 2000.

PCT Search Report for PCT Application No. PCT/US01/48284, filed Oct. 30, 2001 (corresponding to U.S. Appl. No. 09/702,217) mailed May 13, 2002 (7 pgs.).

Sell and buy advice online, The Ottawa Citizen, Nov. 29, 1999.

"UpSnap Selects LookSmart to Sell Premium Listings on Free 411 Service for Text-Enabled Cell Phones", Nov. 4, 2004.

"Welcome to Jambo—the leader in Pay-perCall Solutions" (search results) Oct. 17, 2005.

International Application No. PCT/US05/12061, Written Opinion and International Search Report, Nov. 17, 2006.

International Application No. PCT/US04/15238, Written Opinion and International Search Report, Aug. 29, 2005.

International Application No. PCT/US07/82445, Written Opinion and International Search Report, May 23, 2008.

USPTO Transaction History of U.S. Appl. No. 10/679,982, filed Oct. 6, 2003, entitled "Method and Apparatuses to Provide Pay-Per-Call Performance Based Advertising," now U.S. Patent No. 7,120,235.

USPTO Transaction History of U.S. Appl. No. 11/508,015, filed Aug. 21, 2006, entitled "Method and Apparatuses to Provide Pay-Per-Call Performance Based Advertising."

USPTO Transaction History of U.S. Appl. No. 11/559,866, filed Nov. 14, 2006, entitled "Method and Apparatuses to Track Keywords for Establish Communication Links."

USPTO Transaction History of U.S. Appl. No. 11/565,546, filed Nov. 30, 2006, entitled "Method and Apparatuses to Select Communication Tracking Mechanisms."

USPTO Transaction History of U.S. Appl. No. 11/752,267, filed May 22, 2007, entitled "Method and Apparatuses to Connect People for Real Time Communications Via Voice Over Internet Protocol (VoIP)."

USPTO Transaction History of U.S. Appl. No. 11/761,800, filed Jun. 12, 2007, entitled "Method and Apparatuses to Track Information Using Call Signaling Messages."

USPTO Transaction History of U.S. Appl. No. 11/761,932, filed Jun. 12, 2007, entitled "Method and Apparatuses to Track Information Via Passing Information During Telephonic Call Process."

USPTO Transaction History of U.S. Appl. No. 11/761,987, filed Jun. 12, 2007, entitled "Method and Apparatuses to Track Information Via Telephonic Apparatuses."

ISA/US, International Search Report for International Application No. PCT/US05/12061, 3 pages, Nov. 17, 2006.

International Application No. PCT/US2008/059687, Written Opinion and International Search Report, Aug. 25, 2008.

\* cited by examiner

CALL HANDLING MODULE
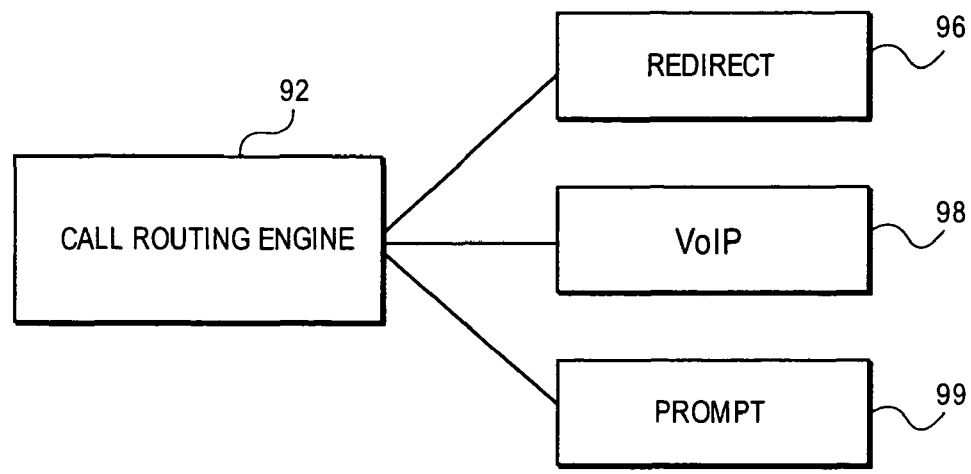
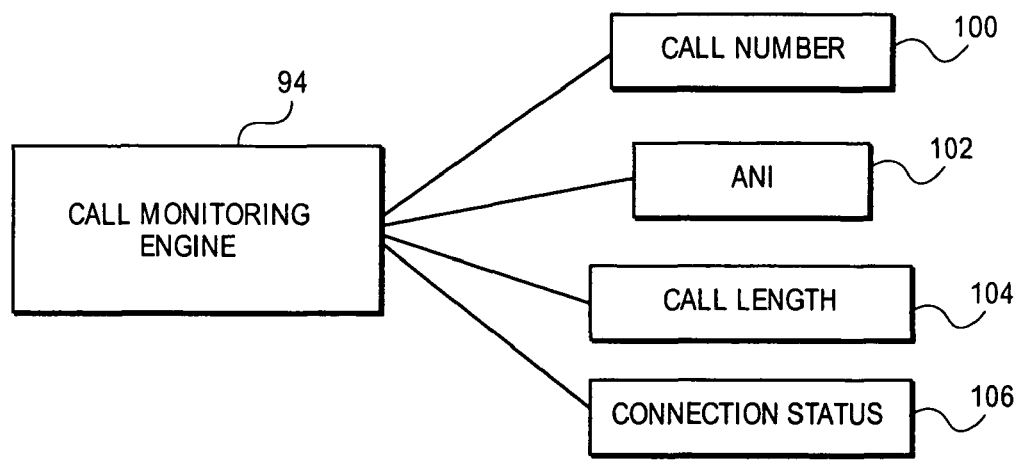
FIG. 7

← 114

SCROLL DOWN to see more listings      Refine your search by Zip Code:

Your search found 105 listings, Listings 1 to 15 listed below...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS            SCROLL DOWN for more listings
                                           City Gold

  Dream Car Rentals
3734 Las Vegas Blvd.
LAS VEGAS, NV
Phone: (702)555-6661
Fax: (702) 555-6665

We Specialize in Excitement! Ferrari's. Viper's Porsche's & Hummers. Harley-Davidson's and SUV's. "DRIVE THE DREAM"

City Gold

RENT-A-VETTE
5021 SWENSON STREET
LAS VEGAS, NV 89119
Phone: (702) 555-2692
Fax: (702) 555-2044

ONLINE LISTINGS                        SCROLL DOWN for more listings

Expedia: For All Your Car Rental Needs  http://www.expedia.com
Save with Expedia.com, your one-stop source for flights, hotels, vacation packages, cruises, and rental

FIG. 9

METHOD AND APPARATUS TO COMPENSATE DEMAND PARTNERS IN A PAY-PER-CALL PERFORMANCE BASED ADVERTISING SYSTEM

The present application claims priority to Provisional U.S. patent application Ser. No. 60/560,926, filed Apr. 9, 2004, the disclosure of the which is incorporated herein by reference.

This application is related to U.S. Patent Application entitled "A Method and Apparatus to Provide Pay-per-Call Performance Based Advertising", application Ser. No. 10/679,982, filed Oct. 6, 2003, the disclosure of which is hereby incorporated by reference.

FIELD OF THE INVENTION

This invention relates to advertising. In particular, the invention relates to performance-based advertising.

BACKGROUND OF THE INVENTION

Performance based advertising refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in performance-based advertising, as described above.

Advertisements may be as simple as a listing returned by a search performed on an on-line directory service. For example, a search conducted on Yahoo!'s Local Yellow Page site for "take-out Italian restaurants" may return a laundry list of results. Once again, however, it is difficult to determine whether calls made by a user to a merchant were actually made because of the advertisement returned by the search.

In one sense, the problem lies in today's pay-per-click standard. It works fine for e-businesses who have web sites, but for the millions of businesses who don't—local plumbers, roofers, florists—clicks don't mean anything. These advertisers need to see a correlation between what they're paying for and what they're getting. Clicks don't show that correlation—a report at the end of the month showing that you got 20 clicks doesn't show value to a local plumber. A phone call, however, does demonstrate value to the advertiser. The advertiser can hear when the phone rings and evaluate the revenues that phone call generated versus the amount he spent on the advertising.

However, using a phone call to determine when to charge an advertiser presents the issue of which demand partner or syndication partner (i.e., Internet site) is to receive credit for having provided the number of the advertiser.

SUMMARY OF THE INVENTION

One embodiment of the present invention provides a method and apparatus to track demand partners in a pay-per call performance based advertising system. In one embodiment, the method and apparatus include assigning at least one telephonic reference to an advertiser, the reference is to be included in an advertisement on a media channel of a demand partner. The advertiser is assessed a charge based at least in part on telephonic connections to the advertiser via the telephonic reference. The demand partner tracked with a predefined tracking model based at least in part on activity related to the telephonic reference.

BRIEF DESCRIPTION OF THE DRAWINGS

FIG. 7 illustrates the Call Handling Module of the system, in greater detail;

FIG. 9 shows an example of a search engine result page, which includes an advertisement generated, in accordance with one embodiment of the present invention;

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
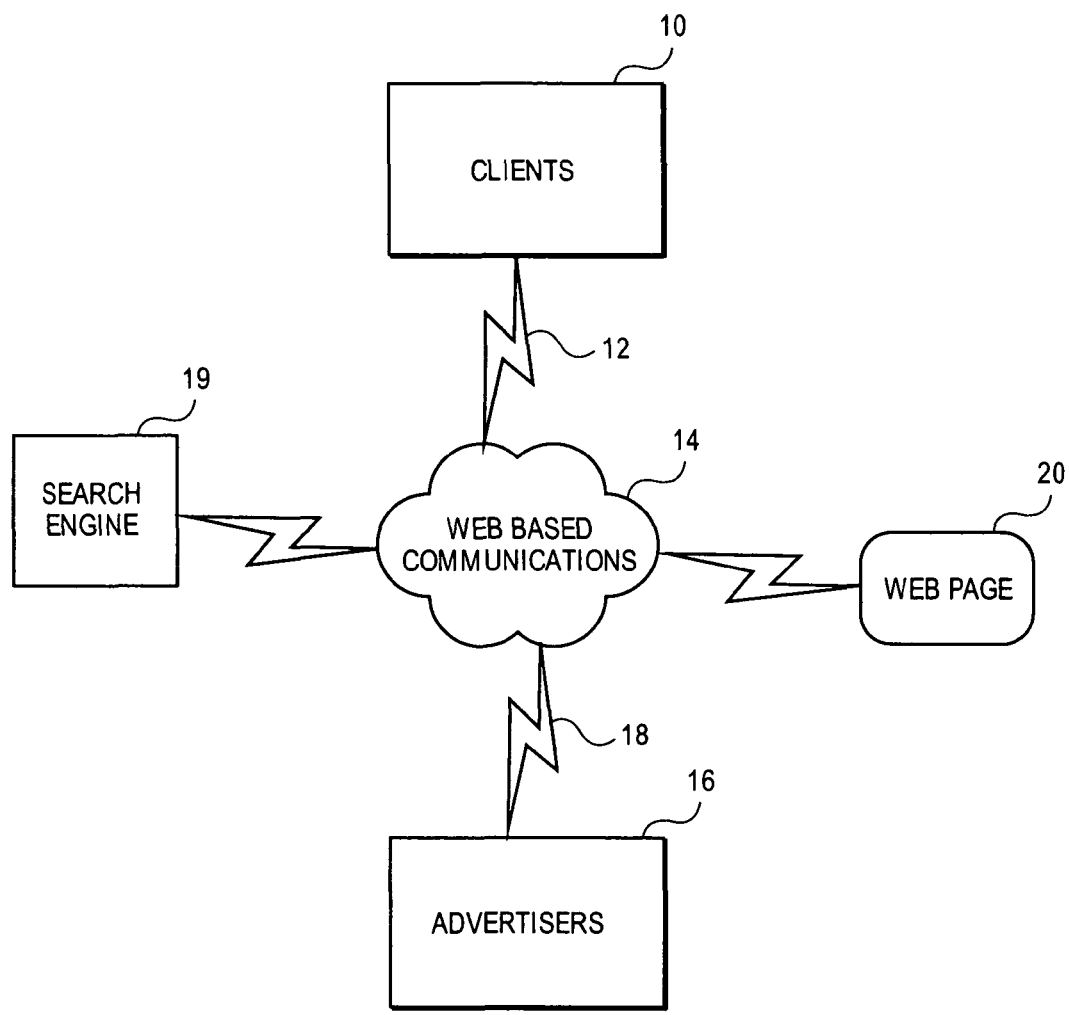
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
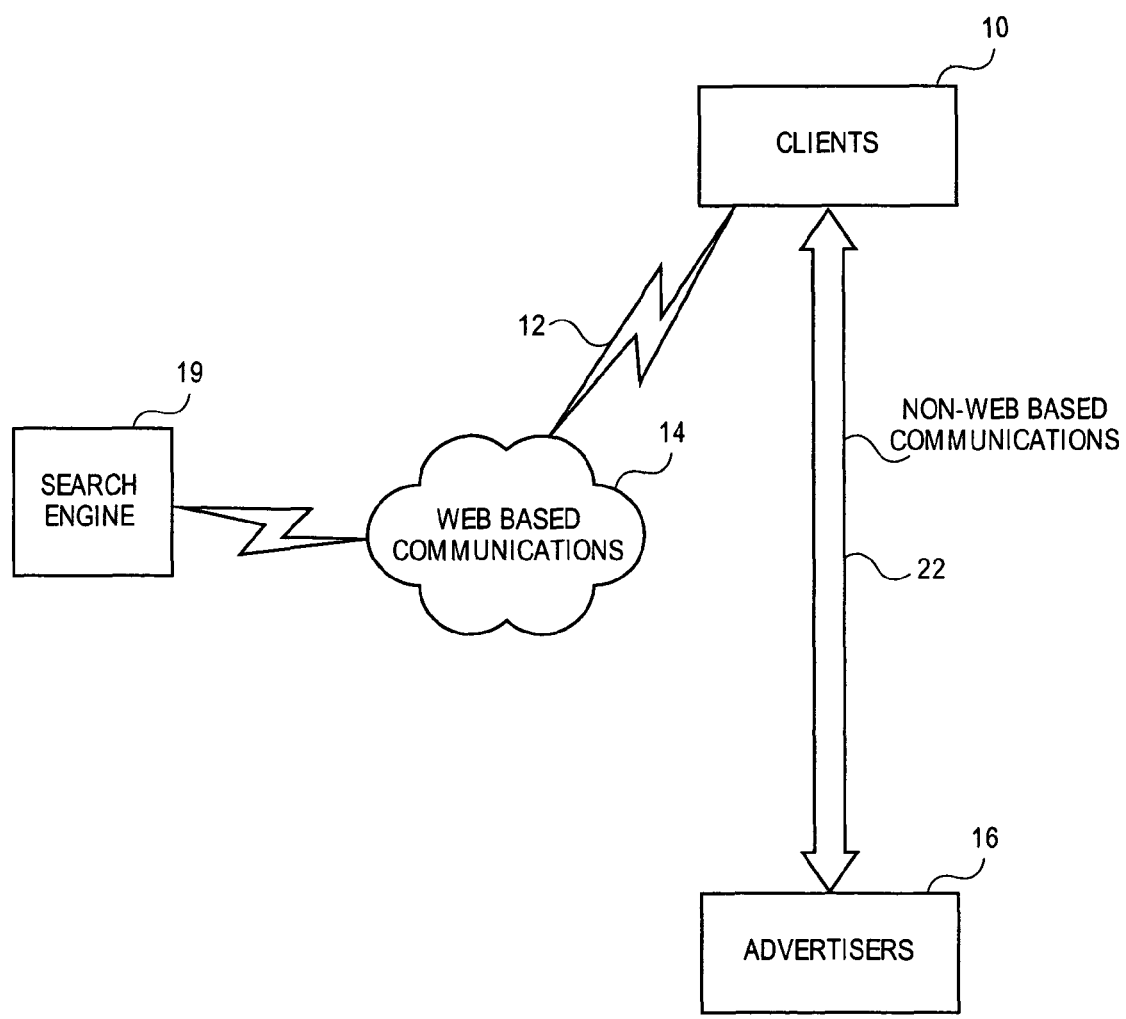
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path 18 between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages 20. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, etc.

Figure 3:
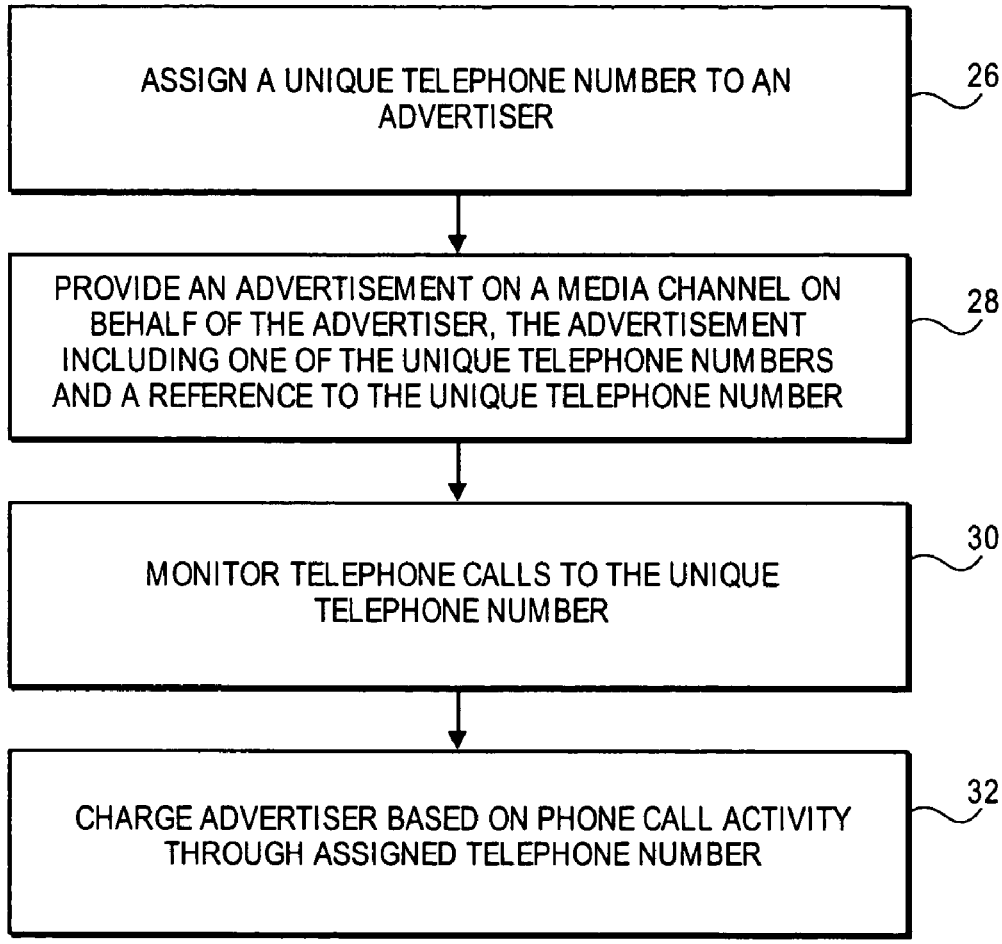
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
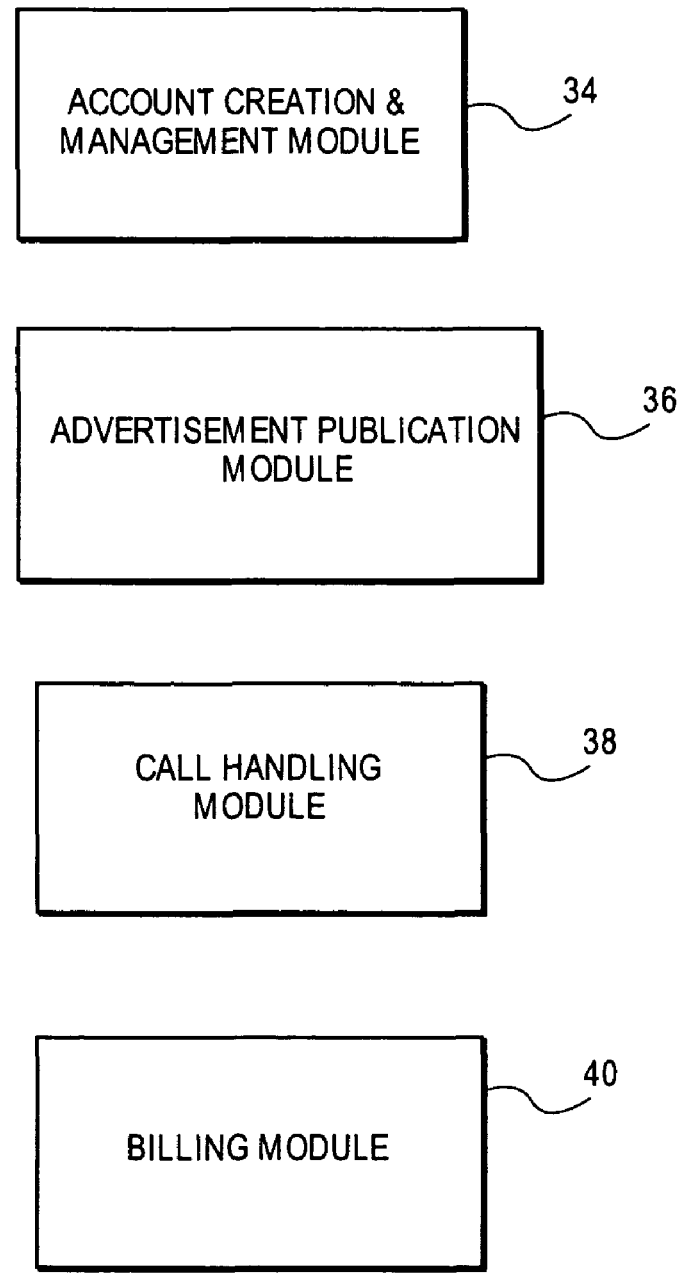
FIG. 4 shows a high level functional description of a system in accordance with one embodiment of the present invention.

FIG. 4 of the drawings shows a functional description of a system to implement the method of FIG. 3 is shown. Referring to FIG. 4, the system includes account creation and management module 34, advertisement publication module 36, call handling module 38, and billing module 40. In alternative embodiments, additional, less, or different modules may be included in the system without departing from the invention.

Figure 5:
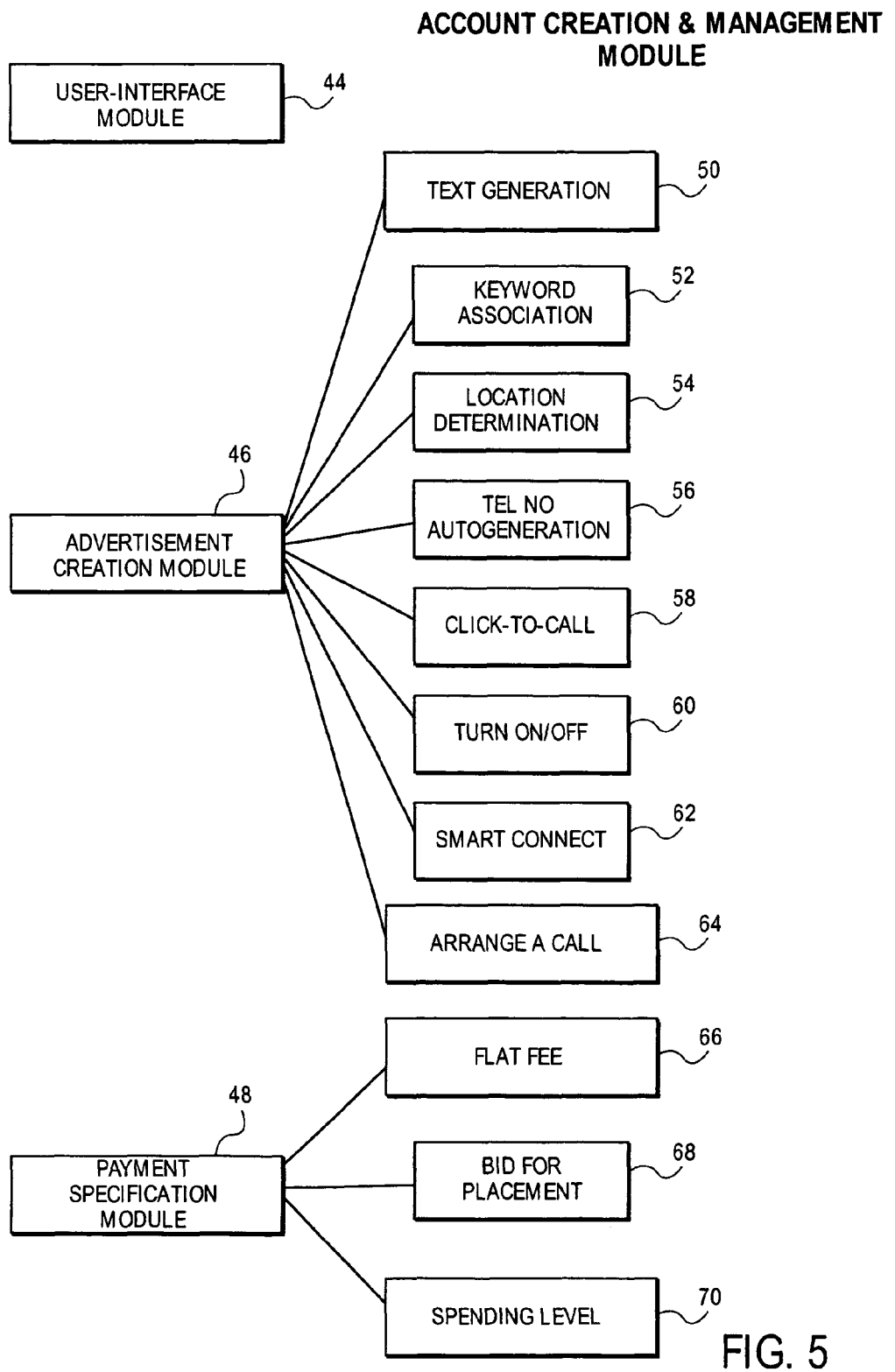
FIG. 5 illustrates the Account Creation and Management module of the system, in greater detail.
Figure 8A:
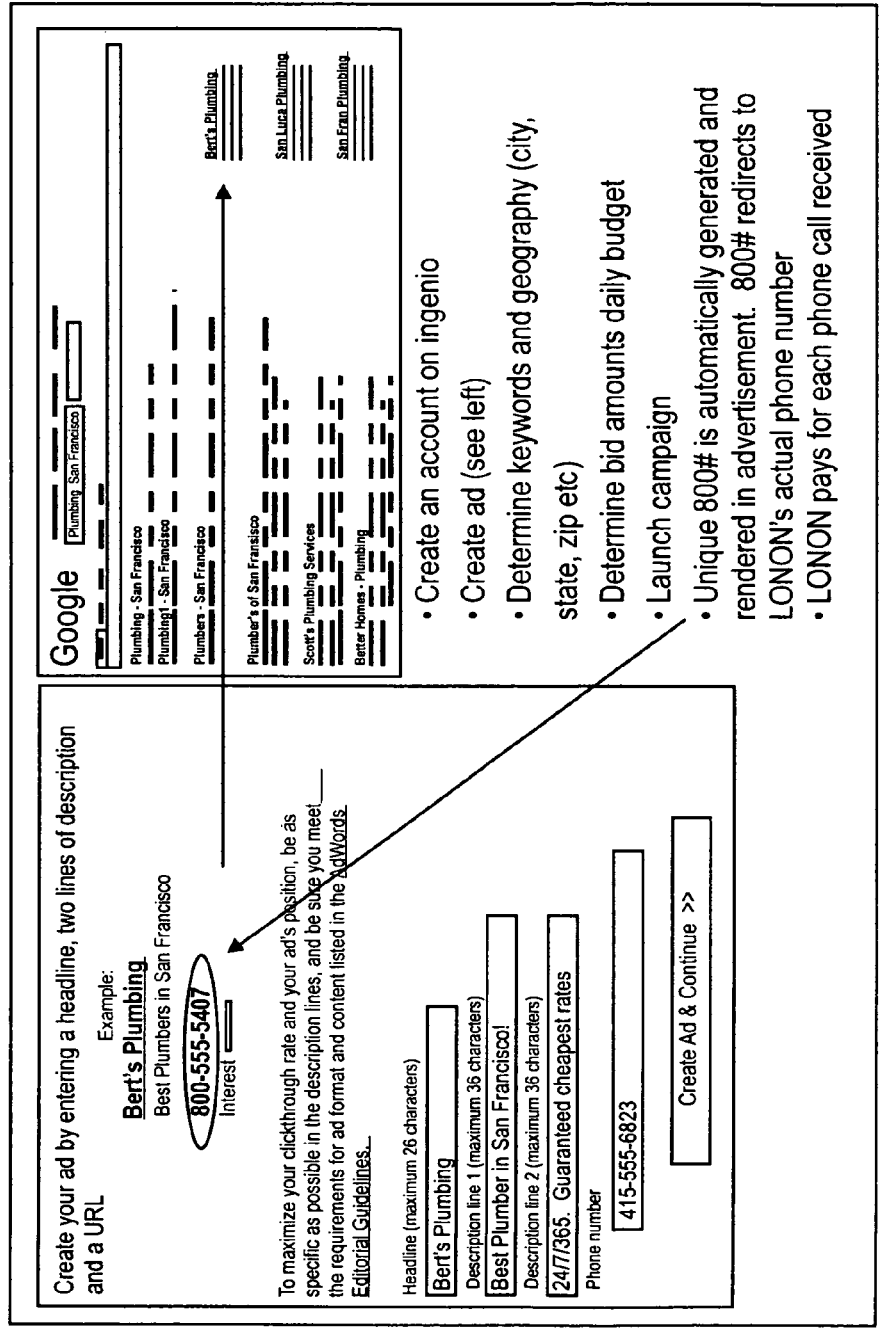
FIG. 8A shows an example of a user interface that may be presented to a user during advertisement creation, in accordance with one embodiment of the present invention.
Figure 8B:
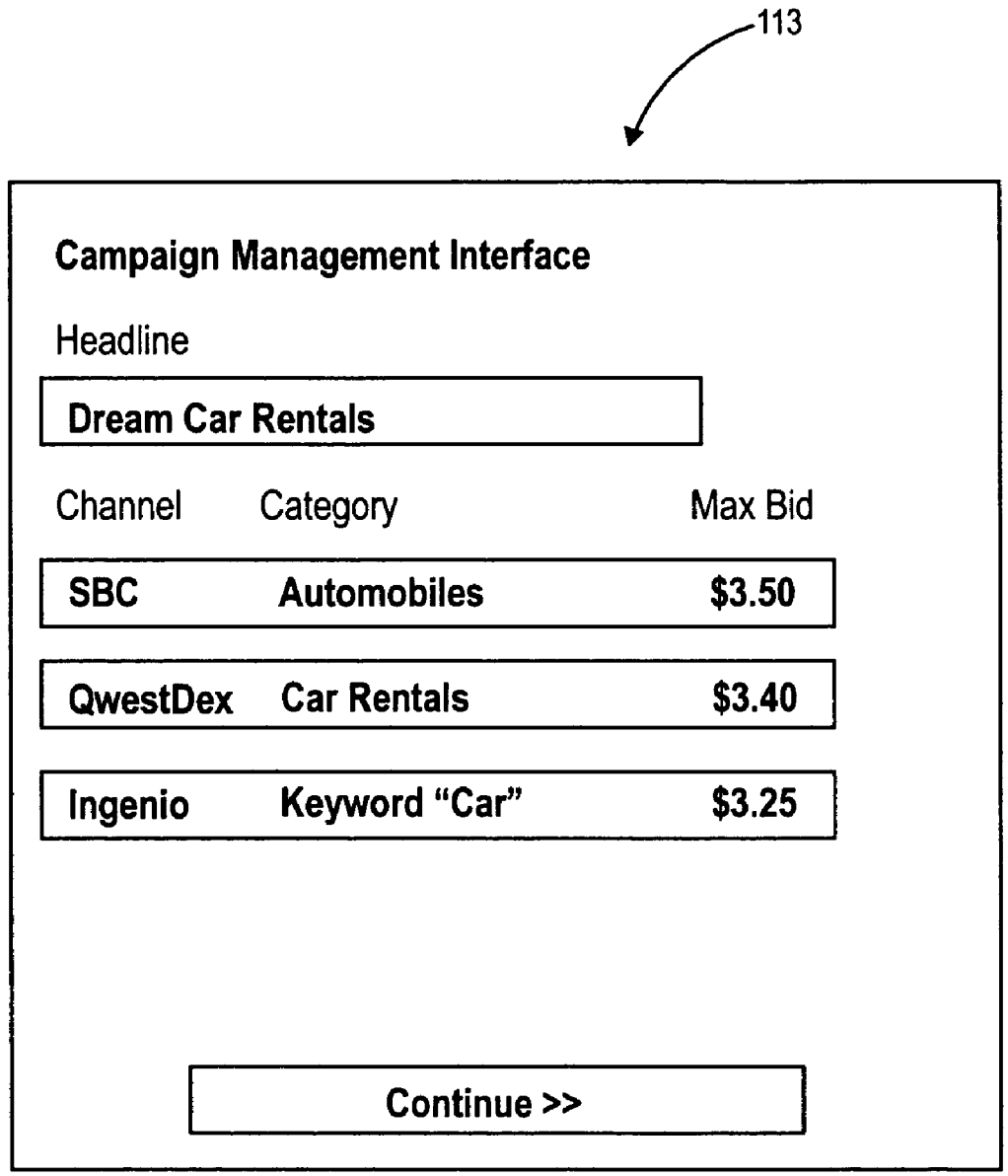
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will only be displayed to clients within the San Francisco area.

The module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1-800-YEL-PAGES-1234, the call will be automatically routed to Burt's telephone as will be described in more detail below.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not made published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the without departing from the invention.

Figure 6:
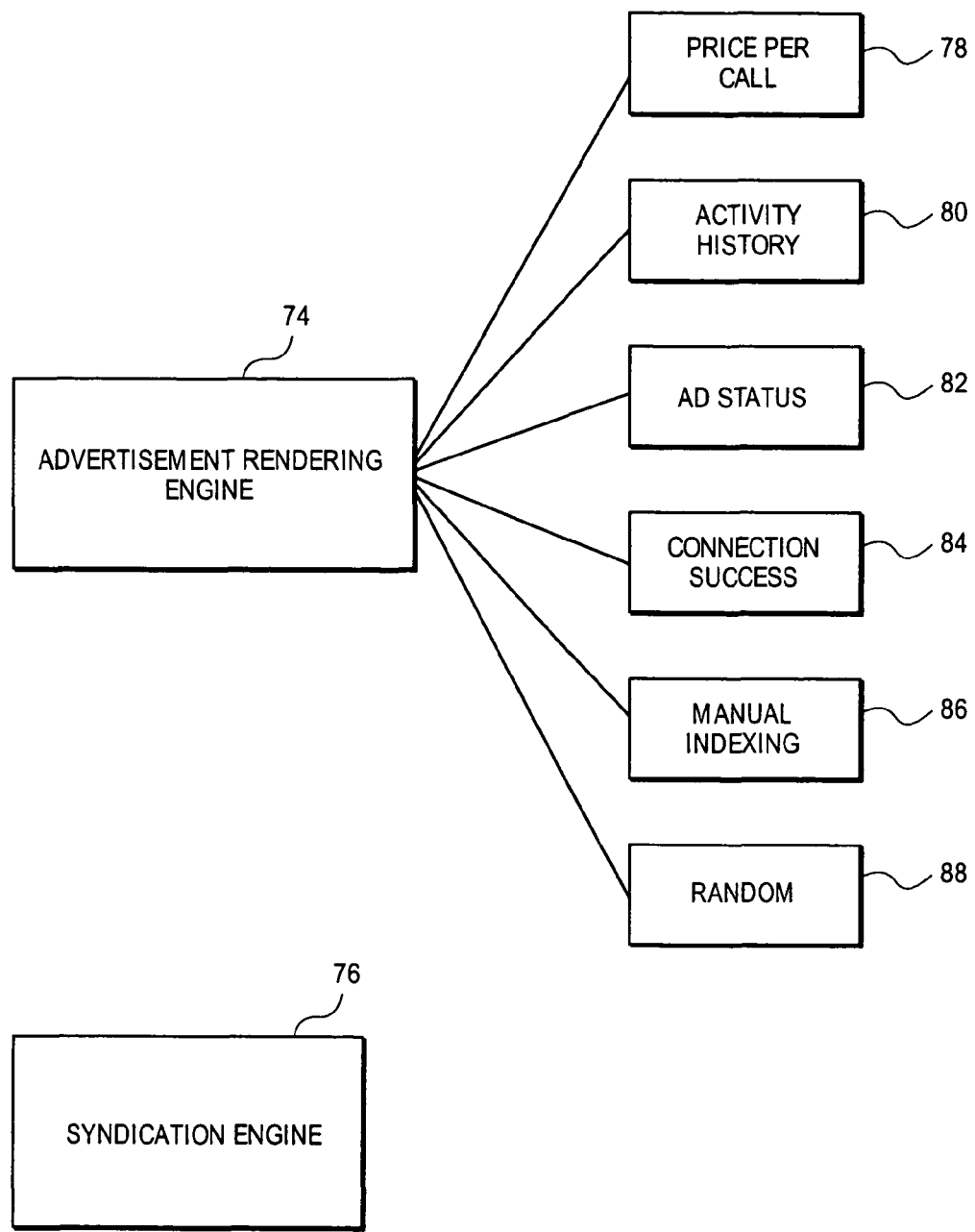
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement rendering engine 74, and an advertisement syndication engine 76. The purpose of the advertisement rendering engine 74 is to automatically render Burt's advertisement on a particular channel. In some embodiments, the advertisement rendering engine 74 causes a campaign management interface 113 (see FIG. 8B of the drawings) to be displayed to an advertiser. The interface 113 allows the advertiser to choose a channel, e.g., SBC, QwestDex, Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement rendering engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately rendered. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
|---|---|---|
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement rendering engine 74 without departing from the invention.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
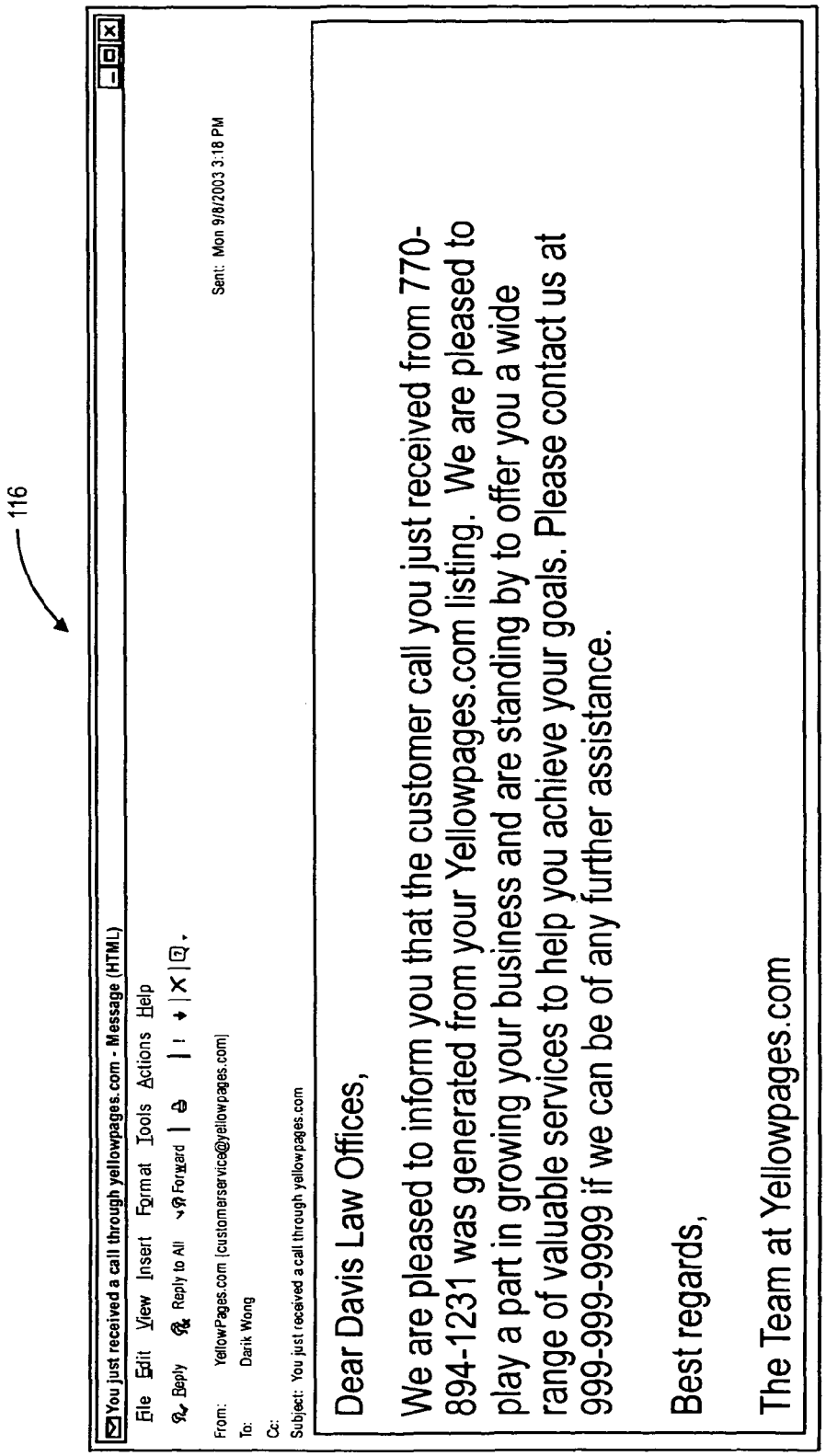
FIG. 10 shows an example of an email alert that is sent to an advertiser, when a call is generated, in accordance with one embodiment of the invention.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100-106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
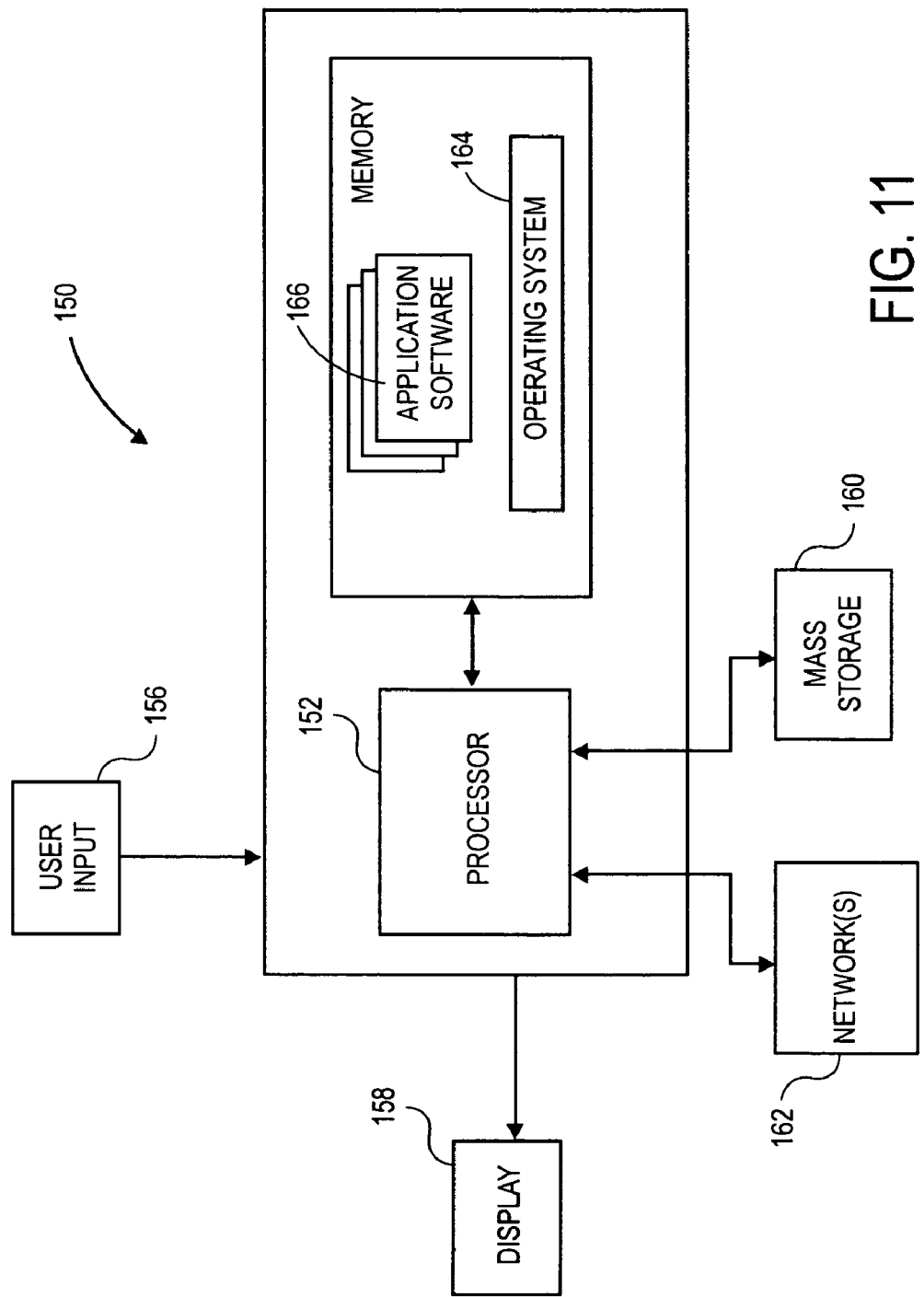
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to a memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or backup memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. Additional examples of third parties include companies such as Yahoo!®, MSN®, AOL®, and other similar demand partners. Often times, these demand partners (also referred to herein as syndication partners) receive a percentage of the advertising revenue generated via the pay-per-call method and system described, herein. Thus, as in the previous example, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
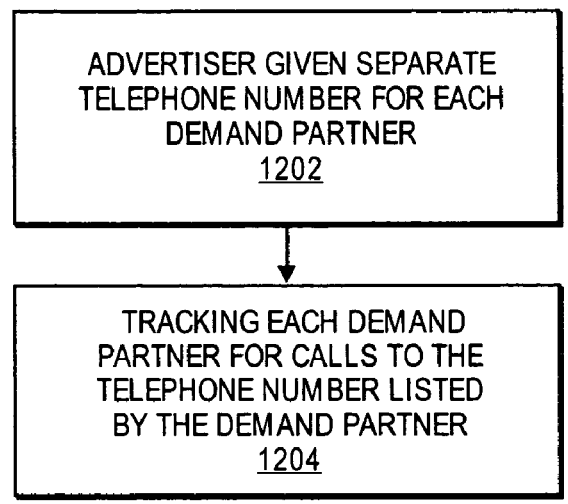
FIG. 12 provides a flow diagram describing the process of tracking a demand partner in a pay-per call performance based advertising system, in accordance with one embodiment.

In one embodiment, described in the flow diagram of FIG. 12, in process 1202 an advertiser (also referred to herein as a merchant or listing) is given a separate telephone number (e.g., alias phone number) for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
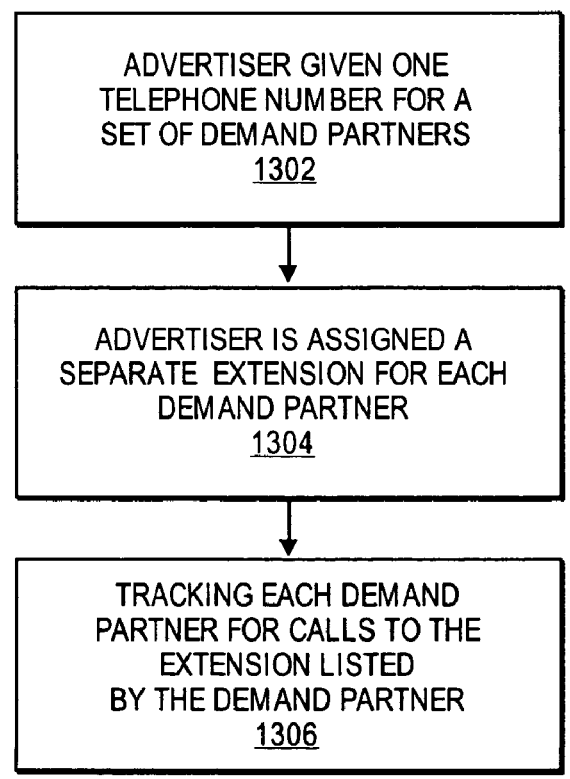
FIG. 13 provides a flow diagram describing the process of tracking a demand partner in a pay-per call performance based advertising system, in accordance with one embodiment.

In another embodiment, described in the flow diagram of FIG. 13, in process 1302 an advertiser receives a single/base telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
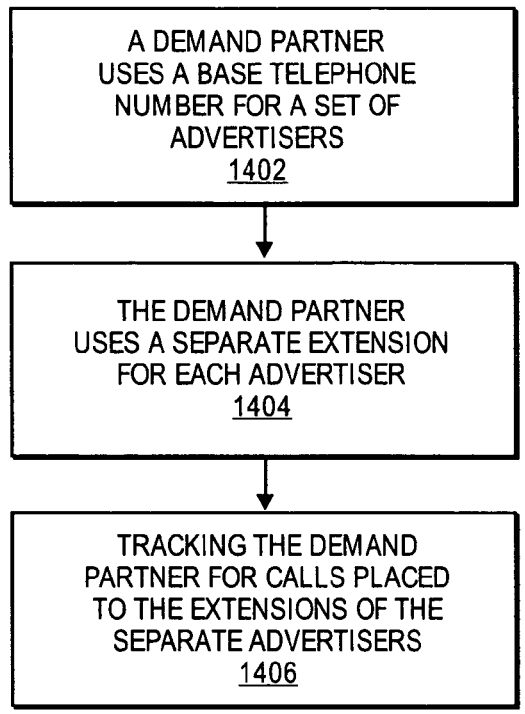
FIG. 14 provides a flow diagram describing the process of tracking a demand partner in a pay-per call performance based advertising system, in accordance with an alternative embodiment.

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
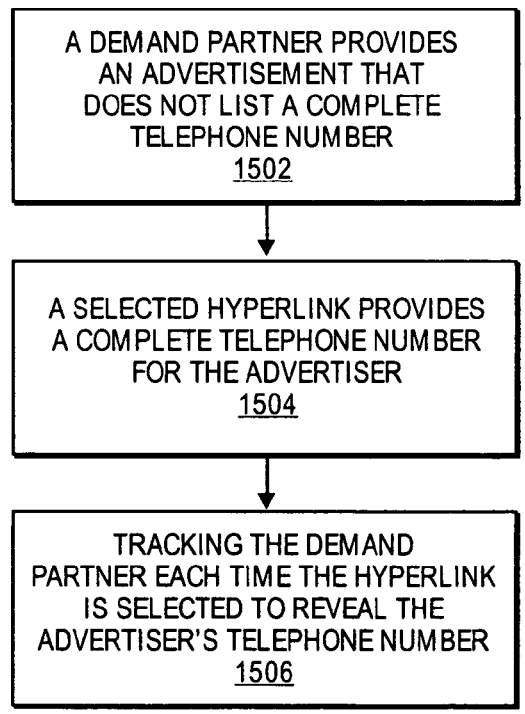
FIG. 15 provides a flow diagram describing the process of tracking a demand partner in a pay-per call performance based advertising system, in accordance with an alternative embodiment.

According to another embodiment, a click-to-reveal method and apparatus is disclosed, as described in co-pending U.S. patent application Ser. No. 10/872,117, entitled "A Method and Apparatus to Provide Pay-Per-Call Advertising and Billing" filed on Jun. 17, 2004, herein incorporated by reference. As described in the flow diagram of FIG. 15, in process 1502 a user is presented with an advertisement via a demand partner's website. The advertisement does not show the advertiser's complete phone number, but instead contains a hyperlink or option to reveal the advertiser's phone number, or the remaining portion of the telephone number. In process 1504, the Advertisement rendering engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
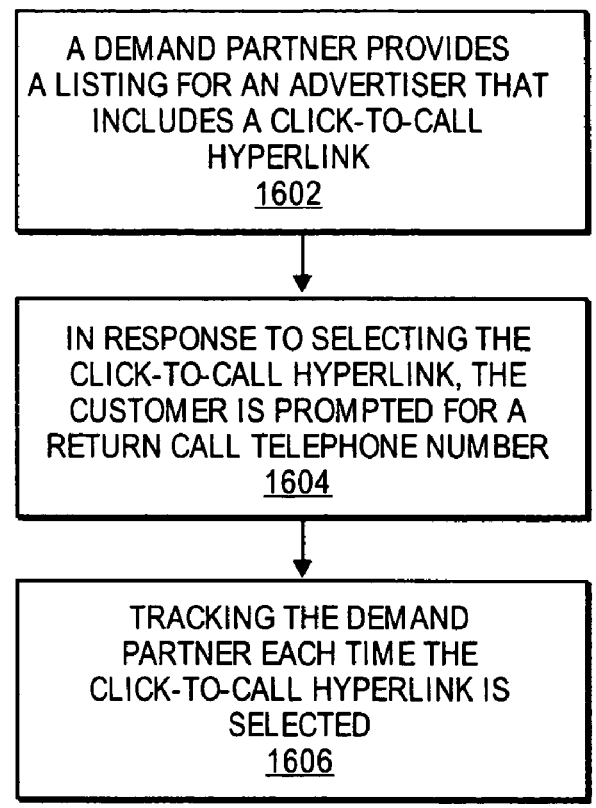
FIG. 16 provides a flow diagram describing the process of tracking a demand partner in a pay-per call performance based advertising system, in accordance with an alternative embodiment.

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link or option is provided by the demand partner to initiate establishing a telephone connection between the viewer/customer and the advertiser in response to the viewer/customer activating/selecting the hyperlink or option provided. In one embodiment, in process 1604, in response to activating/selecting the hyperlink or option provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to or collected from the advertiser) each time a viewer/customer selects/activates a click to call icon for the respective advertiser.

Figure 17:
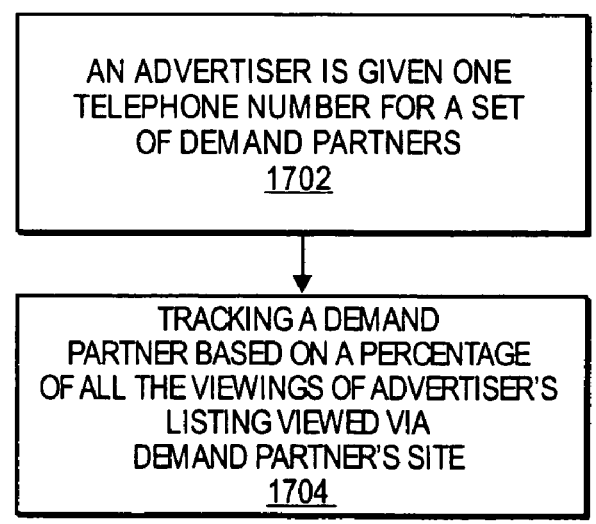
FIG. 17 provides a flow diagram describing the process of tracking a demand partner in a pay-per call performance based advertising system, in accordance with an alternative embodiment.

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
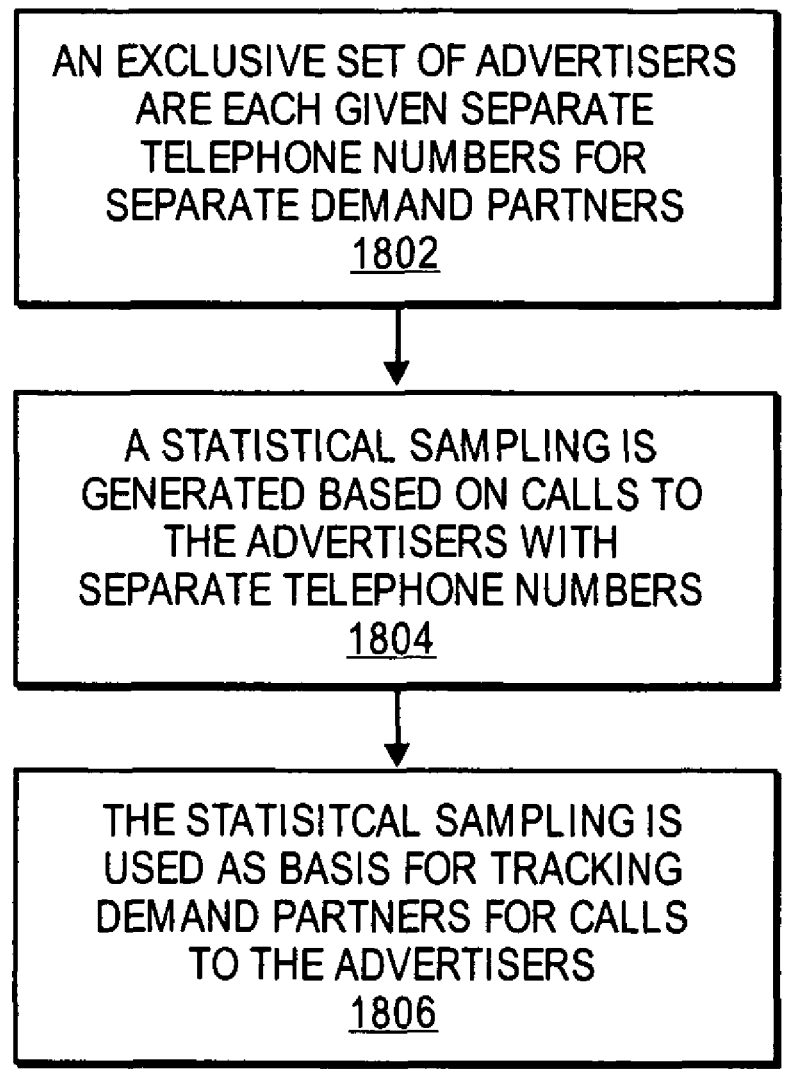
FIG. 18 provides a flow diagram describing the process of tracking a demand partner in a pay-per call performance based advertising system, in accordance with an alternative embodiment.

In another embodiment, described in the flow diagram of FIG. 18, in process 1802 at least a first set of advertisers are each given unique and separate telephonic references for each demand partner. In addition, one or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.)

In process 1806, the samplings are used as a basis for tracking/crediting the demand partners with a percentage of the charges to at least a set of the advertisers. Consider the example of advertisers 1 and 2 are given each give unique telephone references, and 70% of the calls to advertisers 1 and 2 are from telephonic references listed by partner ABC. Given the example, an assumption is made that 70% of the calls to the advertisers using a common number among the demand partners, also originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

With all of the compensation methods described above, various metrics for calculating the compensation to a demand partner (or tracking the demand partner) may be used, in place of percentages of advertising revenue. For example, a demand partner may be paid/tracked hour-by-hour. More specifically, a rate may be calculated based on the number of click-throughs per hour, or the number of click-throughs per day.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A computer implemented method, comprising:
   assigning, via a computing device, a telephonic reference to an advertisement of an advertiser for delivery on a media channel of a demand partner among a plurality of demand partners, wherein a different telephonic reference is assigned to the advertiser for each different demand partner of the plurality of demand partners;
   assessing a charge to the advertiser for the advertisement based at least in part on telephonic connections to the advertiser via the telephonic reference; and
   identifying, using the computing device, the demand partner from the plurality of demand partners, to compensate the demand partner using a portion of the charge for the delivery of the advertisement on the media channel, based on the assigning of the telephonic reference for the delivery of the advertisement on the media channel and based on the telephonic connections connected to the advertiser via the telephonic reference.

2. The method of claim 1, further comprising:
   determining compensations to each respective demand partner based on a number of telephonic connections to the advertiser via a corresponding telephonic reference assigned to the respective demand partner for the advertiser.

3. The method of claim 1, wherein the telephonic reference is a telephone number.

4. The method of claim 1, wherein the telephonic reference is a telephone extension corresponding to a base telephone number.

5. The method of claim 1, further comprising:
   assigning a base telephone number to a set of advertisers for a demand partner, and assigning a separate extension to each advertiser of the set of advertisers, the separate extension corresponding to the base telephone number; and determining compensations to each respective demand partner based on a number of telephonic connections to each of the set of advertisers via the separate extensions assigned to the advertisers.

6. The method of claim 1, wherein the telephonic reference is an option, which when selected by a customer initiates establishing a telephonic connection between the advertiser and the customer; and the demand partner is compensated based on a number of times the option is selected.

7. The method of claim 6, wherein the telephonic connection between the advertiser and the customer is a Voice over Internet Protocol telephonic connection.

8. The method of claim 1, further comprising:

assigning a different telephonic reference to a first advertiser for each different demand partner of a set of demand partners;

assigning one telephonic reference to a second advertiser for the set of demand partners;

generating a statistical sample based on telephonic connections established to the first advertiser via different telephonic references assigned to the first advertiser for each different demand partner of the set of demand partners; and identifying contributions of demand partners for the second advertiser based on the statistical sample.

9. The method of claim 8, wherein the telephonic references assigned to the first advertiser are telephone extensions corresponding to a base number.

10. The method of claim 1, wherein the telephonic reference provided in the advertisement is accessible via an option to reveal the telephonic reference in the advertisement; and the demand partner is compensated based on a number of times the option is selected.

11. A machine-readable medium having stored thereon a set of instructions which when executed by a machine cause the machine to perform a method, the method comprising:

assigning a telephonic reference to an advertisement on a media channel of a demand partner among a plurality of demand partners, wherein a different telephonic reference is assigned to the advertiser for each different demand partner of the plurality of demand partners;

assessing a charge to the advertiser for the advertisement based at least in part on telephonic connections to the advertiser via the telephonic reference; and identifying the demand partner from the plurality of demand partners, to compensate the demand partner using a portion of the charge for the delivery of the advertisement on the media channel, based on the assigning of the telephonic reference for the delivery of the advertisement on the media channel and based on the telephonic connections connected to the advertiser via the telephonic reference.

12. The machine-readable medium of claim 11, wherein the method further comprises:

determining compensations to each respective demand partner based on a number of telephonic connections to the advertiser via a corresponding telephonic reference assigned to the respective demand partner for the advertiser.

13. The machine-readable medium of claim 11, wherein the telephonic reference is an option, which when selected by a customer initiates establishing a telephonic connection between the advertiser and the customer; and the demand partner is compensated based on a number of times the option is selected.

14. The machine-readable medium of claim 11, wherein the method further comprises:

assigning a different telephonic reference to a first advertiser for each different demand partner of a set of demand partners;

assigning one telephonic reference to a second advertiser for the set of demand partners;

generating a statistical sample based on telephonic connections established to the first advertiser via different telephonic references assigned to the first advertiser for each different demand partner of the set of demand partners; and identifying contributions of demand partners for the second advertiser based on the statistical sample.

15. A computer system comprising:

a memory; and at least one processor coupled to the memory to:

assign a telephonic reference to an advertisement of an advertiser for delivery on a media channel of a demand partner among a plurality of demand partners, wherein a different telephonic reference is assigned to the advertiser for each different demand partner of the plurality of demand partners;

assess a charge to the advertiser for the advertisement based at least in part on telephonic connections to the advertiser via the telephonic reference; and identify the demand partner from the plurality of demand partners, to compensate the demand partner using a portion of the charge for the delivery of the advertisement on the media channel, based on the assigning of the telephonic reference for the delivery of the advertisement on the media channel and based on the telephonic connections connected to the advertiser via the telephonic reference.

16. The system of claim 15, wherein the at least one processor is further configured to track each demand partner based on a number of telephonic connections to the advertiser via a telephonic reference corresponding to the demand partner for the advertiser.

17. The system of claim 15, wherein the telephonic reference is an option, which when selected by a customer initiates establishing a telephonic connection between the advertiser and the customer; and the demand partner is compensated based on a number of times the option is selected.

18. The system of claim 15, wherein the at least one processor is further configured to:

assign a different telephonic reference to a first advertiser for each different demand partner of a set of demand partners;

assign one telephonic reference to a second advertiser for the set of demand partners;

generate a statistical sample based on telephonic connections established to the first advertiser via different telephonic references assigned to the first advertiser for each different demand partner of the set of demand partners; and identify contributions of demand partners for the second advertiser based on the statistical sample.

* * * * *